(12) United States Patent
Appleton et al.

(10) Patent No.: US 6,431,079 B1
(45) Date of Patent: Aug. 13, 2002

(54) SURFACE TRAVERSING VEHICLE

(76) Inventors: Ernest Appleton, 9 Dunelm Court, South Street, Durham DH1 4QX; Neil William Stutchbury, 58 Beckenham Avenue, East Boldon, Tyne & Wear NE36 0E, both of (GB)

( * ) Notice: Subject to any disclaimer, the term of this patent is extended or adjusted under 35 U.S.C. 154(b) by 0 days.

(21) Appl. No.: 09/029,821

(22) PCT Filed: Sep. 19, 1996

(86) PCT No.: PCT/GB96/02307

§ 371 (c)(1),
(2), (4) Date: May 4, 1998

(87) PCT Pub. No.: WO97/11307

PCT Pub. Date: Mar. 27, 1997

(30) Foreign Application Priority Data

Sep. 22, 1995 (GB) .............................. 9519368

(51) Int. Cl.⁷ ............................... B61B 13/10
(52) U.S. Cl. .................... 104/138.2; 324/220
(58) Field of Search ................. 104/138.2; 324/220

(56) References Cited

U.S. PATENT DOCUMENTS

| | | |
|---|---|---|
| 3,047,270 A | 7/1962 | Moore, Jr. |
| 3,144,240 A | 8/1964 | Connell |
| 3,593,122 A * | 7/1971 | Barton ........................ 324/220 |
| 4,447,777 A * | 5/1984 | Sharp et al. ................. 324/220 |
| 5,018,451 A * | 5/1991 | Hapstack .................. 104/138.2 |
| 5,080,020 A * | 1/1992 | Negishi .................... 104/138.2 |
| 5,497,707 A * | 3/1996 | Box ........................ 104/138.2 |

FOREIGN PATENT DOCUMENTS

| | | |
|---|---|---|
| DE | 2 355 236 | 1/1978 |
| DE | 33 11 094 A1 | 9/1984 |
| EP | 614592 | 12/1948 |
| EP | 1124732 | 8/1968 |
| EP | 0 523 880 A1 | 1/1993 |
| FR | 2495191 * | 6/1982 |

* cited by examiner

Primary Examiner—S. Joseph Morano
Assistant Examiner—Lars A. Olson
(74) Attorney, Agent, or Firm—Rodman & Rodman

(57) ABSTRACT

A vehicle for traversing a surface, for example for carrying out an inspection, survey or maintenance operation upon that surface, includes two or more bodies interconnected by structure for moving the bodies towards and away from each other, each of the bodies being supported upon a multiplicity of resilient bristles extending from it. By relative movement of the bodies, the vehicle is able to traverse the surface, which may be flat or curved, for example the internal or external surface of a tubular conduit such as a tunnel, shaft or pipe.

38 Claims, 1 Drawing Sheet

SURFACE TRAVERSING VEHICLE

BACKGROUND OF THE INVENTION

The invention is a vehicle for traversing a surface such as for carrying out an inspection, survey or maintenance operation upon that surface. For example, vehicles of this type may be used to traverse a flat surface, or a space between two such surfaces, or to traverse internally or externally the length of a generally tubular conduit such as a pipe, shaft, tunnel, drain, chimney or the like, in a horizontal, vertical or intermediate direction.

Vehicles and similar tools for use in carrying out operations such as inspection and maintenance of the interior of tubular conduits are known and used. Many such vehicles can be used only in conduits which are horizontal or do not depart greatly from the horizontal; many of these rely upon the conduit being more-or-less uniform in cross-section throughout its length.

If a vehicle is to traverse the length of a generally vertical or steeply-inclined surface, then the vehicle must be able to grip the face of the surface sufficiently well to support itself, and any equipment which it is required to carry or move, against the effects of gravity, friction and any other resistance. Thus vertically-traversing vehicles are more difficult to devise and such vehicles as are available for this purpose are usually suitable for use only in tubular conduits of uniform cross-section and having diameters of a specific value or lying within a narrowly-defined range.

Few, if any, prior vehicles are suitable for carrying out exploratory or other operations other than over the interior surfaces of such uniform tubular conduits. Such vehicles are not able satisfactorily to carry out such operations even in tubular conduits of varying cross-sectional size or shape, whether or not those conduits are generally horizontal. They are also usually unsuitable for use when the inner surface of a tubular conduit has irregularities such as hollows or localised projections.

OBJECT AND SUMMARY OF THE INVENTION

Against this background, it is an object of the present invention to provide a surface traversing vehicle which is suitable for use upon a wide variety of smooth and/or irregular surfaces, including those of a wide range of generally tubular conduits of uniform or irregular cross-sectional size and/or shape and also generally planar surfaces of uniform or irregular shape, any of which surfaces may be horizontal, vertical or intermediate these directions.

The surface traversing vehicle according to the present invention comprises two bodies interconnected by means to move the bodies towards and away from each other, each said body being supported upon a multiplicity of resilient bristles extending from it. It has unexpectedly been found that alternate moving of the bodies towards and away from each other causes the vehicle to move in successive steps along a generally linear path over the surface upon which the vehicle is supported. For example, when the vehicle is placed within a tubular conduit having an average inside diameter a little less than the maximum overall dimension of the bristles measured in that diametrical direction, the vehicle traverses the length of the conduit in this way.

Subject to the foregoing features, the particular detailed form of the surface traversing vehicle according to the present invention will depend upon the general nature of the surface to be traversed. For example, the shape of the bristle-carrying bodies may be generally flat when the vehicle is to be used to traverse a generally planar surface or when it is to traverse a space between two adjacent generally planar, generally parallel surfaces. For use upon or within tubular conduits they may be elongate in the direction of the length of the vehicle or relatively short in that direction and are preferably rotationally symmetrical about that direction. Thus, for example, they may be generally cylindrical in shape. However, they may also be non-symmetrical or irregular in shape, in order to correspond to the cross-sectional shape of the conduit upon or within which they are intended to be used.

The bristles extending from these bodies are resilient and are directed generally towards the surface which is to be traversed. For example, if that surface is a single generally flat surface, then the bristles may extend generally parallel to each other in a single direction away from each of the bodies. If the surface is one of a pair of such surfaces, then the bristles will normally extend in two opposite directions. When the vehicle is intended for use within a generally tubular conduit, the bristles are directed outwardly from the bodies. However, the bodies may alternatively be of generally annular cross-section, with the bristles directed inwardly, for use to traverse the outside of a chimney, post, cable or the like.

The bristles upon which the bodies are supported may extend, when in an unstressed state, in a direction which is generally perpendicular to the surface of the body, for example radially outwardly or inwardly in the case of a generally cylindrical (including annular) body. Alternatively, the bristles may be slightly inclined to that direction. They may all be mounted in mutual parallel or they may be off-set from parallel, for example in pairs of mutually inclined bristles.

When the vehicle according to the present invention is in use, it is necessary for the bristles to be diverted to a greater or lesser extent from their unstressed orientation. The required resiliency of the bristles enables them to return, or to tend to return, to that unstressed orientation and then, if the vehicle is to be reversed, to be diverted beyond that orientation into a new inclination in an opposite direction. The bristles may be natural bristles or may be of any other material having the desired resiliency, for example a synthetic polymeric material or a metal. The material ideally displays a relatively high stiffness coupled with a high rate of elasticity. When the vehicle is used to carry a relatively light load, for example a camera to inspect the surface in question, then synthetic polymeric material bristles, for example of nylon, are suitable. When better traction is required, for example when the vehicle is to tow behind it a relatively heavy load, then metal bristles, for example of steel, are preferred. Mixtures of bristles of different materials and/or of different lengths may also be used.

If, having performed the desired function, the vehicle is required to move in the reverse direction, for example to enable it to be retrieved or because it has encountered an obstruction, it is necessary for the inclination of the bristles to be reversed. This result may be achieved in any of a number of different ways. Since movement of the vehicle over a surface requires one of the bodies to remain stationary while the other moves towards or away from it, the main requirement is to reverse the inclination of the bristles on a first body, preferably that one which is rearmost during the initial forward movement of the vehicle. The vehicle may therefore be constructed with, for example, shorter bristles on the first unit, to enable more ready reversal of the bristles.

As another approach to aiding reversal of the vehicle, one or more of the bodies may be constructed with retractable bristles and/or a mechanism may be provided specifically for the purpose of reversing the inclination of the bristles. As a further alternative, the vehicle may be reversed simply by pulling the whole vehicle, or just the rearmost body, backwards by a distance sufficient to cause the bristles to move to the oppositely-inclined position. This may be achieved by pulling manually upon a line attached to the vehicle, or by, say, operating a pneumatic or hydraulic cylinder included in such a line.

When as in most operating situations, the vehicle is required to change from forward motion to rearward motion within a limited space, for example within a tubular conduit, the movement of the bristles within that space may be aided by providing means to rotate one or more of the bodies about its axis.

In one form of the present invention, the vehicle is required to traverse a single flat surface. To that end, the vehicle may be retained in contact with that surface simply by gravity. However one preferred alternative, which may then allow the vehicle to traverse an inclined or even a vertical surface, is to provide means whereby to retain the vehicle against the surface magnetically, for example using a permanent magnet or electromagnetically.

The means for moving the bristle-carrying bodies towards and away from each other may take any desired form, being chosen to reflect various factors including the circumstances and/or conditions in which the vehicle is to be used. For example the means may be electrically-powered by a direct electrical line or by a battery, preferably a rechargeable battery. In one preferred form of the invention, the means is a pneumatic or hydraulic cylinder, by means of which the bodies may be moved apart when operating fluid is supplied to the cylinder and moved towards each other when the fluid flow is reversed.

The linking together of the bristle-carrying bodies may be rigid or relatively so, especially when the vehicle comprises only two such bodies. However, in general it is preferred that the bodies be flexibly interconnected, in particular to enable the vehicle to traverse non-linear, for example curved or angled, conduits.

While the bodies are supported upon the bristles which extend from them, some of the weight of the vehicle may be carried by one or more wheels, for example in pairs, located upon the bodies themselves and/or upon the links, for example pneumatic cylinders, disposed between adjacent bodies. Such wheels also may provide stability to the linear movement of the vehicle, which might otherwise jack-knife in some circumstances.

The vehicle may comprise only two bristle-carrying bodies or may comprise three or more such bodies. In the latter case, it is preferred that the mutual approaching and moving apart of adjacent bodies be phased so as to lead to a sequence of such movements along the length of the vehicle, thereby smoothing out the progression of the vehicle along the conduit. However in one alternative arrangement, the bodies may be coupled together in pairs, the two bodies in each pair being coupled at a fixed distance apart, to enable the effective length of each body to be increased.

The operation of a vehicle according to the invention comprising three or more of the bristle-carrying bodies, by bringing about the relative movement of adjacent bodies in a pre-determined sequence, may be effected automatically by means of a suitable controller, which may be located upon the vehicle or remote from it; in the latter case, an electrical link from the remote location to the vehicle may be by means of a direct electrical line—or a radio link may be provided for the purpose.

When the vehicle is designed to be operated pneumatically, an air line may be provided from a remote source of compressed air to the pneumatic cylinders. That line may be combined with an electrical line, in the form of an umbilical linking the remote control position to the vehicle. The umbilical may in turn be dragged behind the vehicle by means of a similar towing vehicle specifically provided for that purpose. As the vehicle proper moves further from the control position, supplementary such umbilical tugs may be added. Sensors in the line may monitor tension in the umbilical and in turn prompt an umbilical tug to respond by accelerating or decelerating briefly.

The vehicle according to the invention may be used for a wide range of purposed in a wide number of situations. It will most usually carry or convey a tool to apply some treatment to the interior surface of a tubular conduit, for example to clear debris or growth therefrom, or some form of monitoring device or instrument, for example to survey or explore the shape or condition of such a conduit. Thus it may be used in mine shafts, in chimneys, in tunnels and in pipes conveying utility services such as water, electrical and gas pipelines, telecommunication lines and sewers. In other forms, it may be used to traverse the space between parallel surfaces, for example between the hulls of a twin-hulled tanker or other sea-going vessel, or to survey or treat a single planar surface.

The vehicle is particularly suitable for use in hazardous environments, for example where there may be a risk of fire and/or explosion, because it does not require to have any electrical or electronic components.

DESCRIPTION OF THE DRAWINGS

The invention is further described and illustrated with reference to the accompanying drawings, which illustrate, by way of example only, one simple embodiment of the vehicle according to the present invention and wherein.

DETAILED DESCRIPTION OF THE INVENTION

The illustrated vehicle comprises two short generally cylindrical bodies 10, 11, linked together by a pneumatic cylinder 12, to which the two bodies are pivotally coupled at 13 and 14 respectively. Each of the bodies has a substantial number of resilient bristles 15 extending radially outwardly from around its curved surface.

Figure 1:
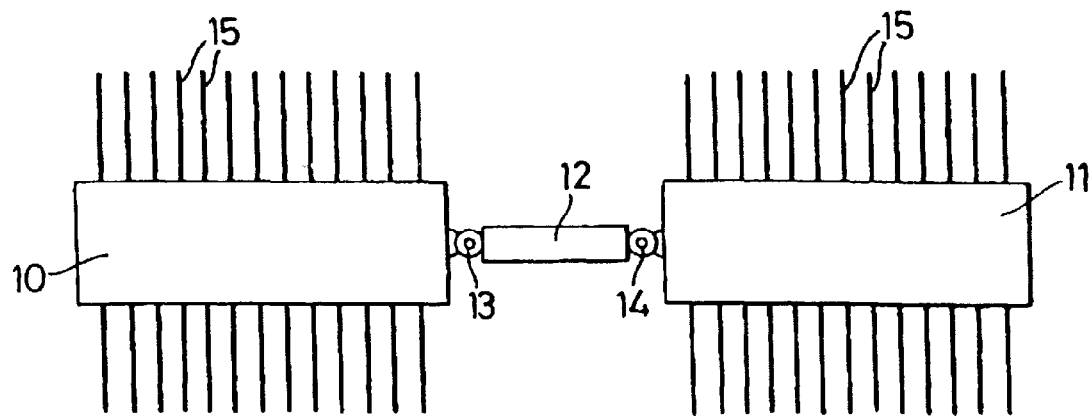
FIG. 1 is an elevation of the vehicle.
Figure 2:
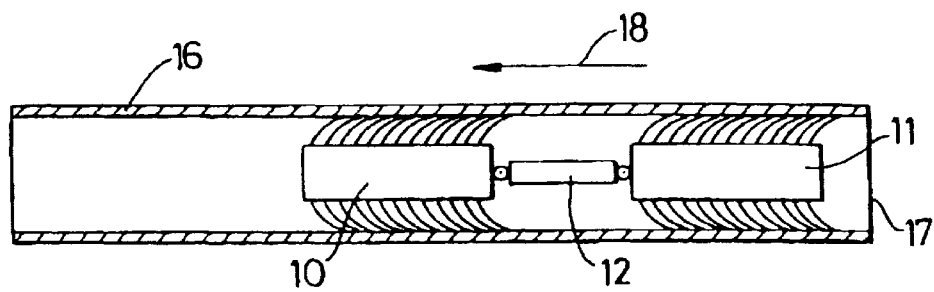
FIGS. 2 to 4 show, to a smaller scale, three successive positions of the vehicle in use within a pipe.
Figure 4:
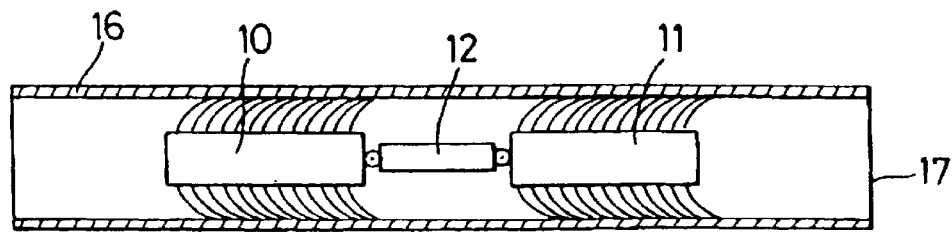

FIGS. 2 and 4 show how the vehicle is able to progress, from right to left as illustrated, along a pipe 16, only a short part of the length of which is illustrated. The vehicle is introduced to the pipe at its right-hand end 17 and, since the inside diameter of the pipe 16 is somewhat less than the maximum overall lateral diameter of the vehicle between the ends of the bristles 15, the bristles adopt a position in which they are curved and inclined towards the right, at an average angle of the order of between 15 and 45 degrees.

Figure 3:
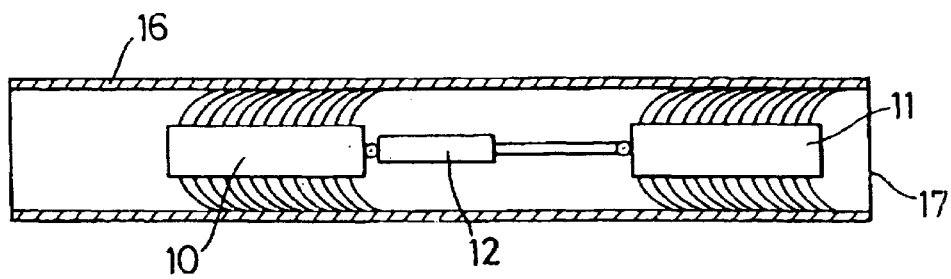

In order to advance the vehicle along the pipe in the direction of the arrow 18, air is introduced into the cylinder 12 and the bodies 10, 11 are thereby urged apart. The orientation of the bristles on the body 11 resists rearward movement of that body and the body 10 is therefore thrust forwards, the rearwardly-directed bristles thereon offering less resistance to that motion, so that the bodies adopt the positions shown in FIG. 3. Upon subsequent evacuation of the cylinder 12 (FIG. 4), the body 11 is drawn forwards towards the body 10 until the cylinder is fully retracted as shown. As will readily be understood, alternate extension and retraction of the cylinder thus causes the vehicle to advance, progressively and stepwise, through the pipe 16 in the direction of the arrow 18.

In experimental use, the illustrated vehicle has been shown to be able to advance vertically, horizontally and at intermediate inclinations along a tubular conduit and to take with it loads substantially greater than its own weight.

What is claimed is:

1. A maintenance inspection or repair vehicle for traversing a surface to perform a maintenance, inspection or repair operation upon that surface comprising at least two bodies interconnected by means to move adjacent said bodies towards and away from each other, each said body being supported upon a multiplicity of resilient bristles extending from it, characterised in that a plurality of said bristles are inclined relative to a plane transverse to the direction of movement of said bodies towards and away from each other prior to the bristles engaging a surface to be traversed by the vehicle.

2. A vehicle according to claim 1, characterised in that each body is generally flat.

3. A vehicle according to claim 2, characterised in that the bristles extend from at least one single flat face of each body.

4. A vehicle according to claim 3, characterised by means to retain the vehicle against a surface magnetically.

5. A vehicle according to claim 2, characterised in that the bristles extend in opposite directions from opposite flat faces of each body.

6. A vehicle according to claim 1, characterised in that each body is rotationally symmetrical about the length of the vehicle.

7. A vehicle according to claim 6, characterised in that each body is generally cylindrical and the bristles extend outwardly from the bodies.

8. A vehicle according to claim 6, characterised in that each body is of generally annular cross-section and the bristles extend inwardly from the bodies.

9. A vehicle according to claim 1, characterised in that the bristles are natural bristles or of a synthetic polymeric material or a metal.

10. A vehicle according to claim 9, characterised in that the bristles are of nylon or steel.

11. A vehicle according to claim 1, characterised in that the bristles are of different materials and/or of different lengths.

12. A vehicle according to claim 1, characterised by retractable bristles.

13. A vehicle according to claim 1, characterised in that the bristles are natural bristles or of a synthetic polymeric material or a metal.

14. A vehicle according to claim 13, characterised in that the bristles are of nylon or steel.

15. A vehicle according to claim 1, characterised by a line which includes a pneumatic or hydraulic cylinder to enable movement of the vehicle to be reversed.

16. A vehicle according to claim 1, characterised by means to rotate one or more of the bodies about its axis.

17. A vehicle according to claim 1, characterised in that the means to move the bodies towards and away from each other is electrically powered.

18. A vehicle according to claim 1, characterised in that the means to move the bodies towards and away from each other is a pneumatic or hydraulic cylinder.

19. A vehicle according to claim 1, characterised in that the bodies are flexibly interconnected.

20. A vehicle according to claim 1, characterised by having one or more wheels located upon the bodies and/or upon the links between adjacent bodies.

21. A vehicle according to claim 1, characterised in that it comprises more than two said bodies, coupled together in pairs at a fixed distance apart.

22. A vehicle according claim 1, characterised in that it comprises three or more said bodies, each interconnected for movement towards and away from the adjacent body or bodies.

23. A vehicle according to claim 22, characterised in that relative movement of adjacent bodies is effected automatically by means of a controller.

24. A vehicle according to claim 1, characterised by an umbilical linking the vehicle to a remote control position.

25. A maintenance inspection or repair vehicle for traversing a surface to perform a maintenance, inspection or repair operation upon that surface comprising at least two bodies interconnected by means to move adjacent said bodies towards and away from each other, each said body being supported upon a multiplicity of resilient bristles extending from it, characterised in that a plurality of said bristles are arranged in pairs of mutually inclined bristles.

26. A vehicle according to claim 25, characterised in that each body is generally flat.

27. A vehicle according to claim 26, characterised in that the brisles extend from at least one single flat face of each body.

28. A vehicle according to claim 27, characterised by means to retain the vehicle against a surface magnetically.

29. A vehicle according to claim 26, characterised in that the bristles extend in opposite directions from opposite flat faces of each body.

30. A vehicle according to claim 25, characterised in that each body is rotationally symmetrical about the length of the vehicle.

31. A vehicle according to claim 30, characterised in that each body is generally cylindrical and the bristles extend outwardly from the bodies.

32. A vehicle according to claim 30, characterised in that each body is of generally annular cross-section and the bristles extend inwardley from the bodies.

33. A vehicle according to claim 25, characterised in that the bristles are of different materials and/or of different lengths.

34. A vehicle according to claim 25, characterised by retractable bristles.

35. A maintenance inspection or repair vehicle for traversing a surface to perform a maintenance, inspection or repair operation upon that surface comprising at least two bodies interconnected by means to move adjacent said bodies towards and away from each other, each said body being supported upon a multiplicity of resilient bristles extending from it, characterised in that the bristles are of different materials.

36. A maintenance inspection or repair vehicle for traversing a surface to perform a maintenance, inspection or repair operation upon that surface comprising at least two bodies interconnected by means to move adjacent said bodies towards and away from each other, each said body being supported upon a multiplicity of resilient bristles extending from it, characterised by retractable bristles.

37. A maintenance inspection or repair vehicle for traversing a surface to perform a maintenance, inspection or repair operation upon that surface comprising a first vehicle part including at least two bodies interconnected by means to move adjacent said bodies towards and away from each other, each said body being supported upon a multiplicity of resilient bristles extending from it, characterised by a further vehicle part, for towing an umbilical linking the first vehicle to a remote control position.

38. A vehicle according to claim 37, characterised by having one or more sensors to monitor tension in the umbilical.

* * * * *